(12) United States Patent
Cariou et al.

(10) Patent No.: US 10,708,720 B2
(45) Date of Patent: Jul. 7, 2020

(54) ENHANCED LOCATION SERVICE NEGOTIATION

(71) Applicant: Intel IP Corporation, Santa Clara, CA (US)

(72) Inventors: Laurent Cariou, Portland, OR (US); Jonathan Segev, Tel Mond (IL)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 16/480,262

(22) PCT Filed: Dec. 20, 2017

(86) PCT No.: PCT/US2017/067709
§ 371 (c)(1),
(2) Date: Jul. 23, 2019

(87) PCT Pub. No.: WO2018/140177
PCT Pub. Date: Aug. 2, 2018

(65) Prior Publication Data
US 2020/0015041 A1    Jan. 9, 2020

Related U.S. Application Data

(60) Provisional application No. 62/449,906, filed on Jan. 24, 2017.

(51) Int. Cl.
*H04W 4/029* (2018.01)
*H04W 4/50* (2018.01)

(52) U.S. Cl.
CPC .......... *H04W 4/029* (2018.02); *H04W 4/50* (2018.02)

(58) Field of Classification Search
CPC .................. H04W 4/029; H04W 4/50
See application file for complete search history.

(56) References Cited

U.S. PATENT DOCUMENTS

| 9,781,566 B1* | 10/2017 | Rison .................. H04W 4/023 |
| 2012/0155302 A1 | 6/2012 | Jeong |
| 2012/0258732 A1 | 10/2012 | Jeong |
| 2013/0031001 A1 | 1/2013 | Frechette et al. |

(Continued)

FOREIGN PATENT DOCUMENTS

WO    2016126280    8/2016

OTHER PUBLICATIONS

International Search Report and Written Opinion for PCT Application No. PCT/US2017/067709, dated Nov. 12, 2018, 10 pages.

*Primary Examiner* — Wayne H Cai
(74) *Attorney, Agent, or Firm* — Eversheds Sutherland (US) LLP

(57) ABSTRACT

This disclosure describes systems, methods, and devices related to enhanced location service negotiation. A device may identify a neighbor report frame received from one or more coordinated access points (APs), wherein the neighbor report frame comprises location capability support information. The device may determine a first ranging associated ID (R-AID) associated with the location capability support information. The device may determine a first location measurement with a first coordinated AP of the one or more coordinated APs and a second location measurement with a second coordinated AP of the one or more coordinated APs using the first R-AID.

18 Claims, 9 Drawing Sheets

(56) References Cited

U.S. PATENT DOCUMENTS

| | | | |
|---|---|---|---|
| 2013/0196691 A1 | 8/2013 | Liang | |
| 2014/0057637 A1* | 2/2014 | Hoang | H04W 56/0045 |
| | | | 455/445 |
| 2015/0172958 A1* | 6/2015 | Allanki | H04W 48/06 |
| | | | 370/235 |
| 2019/0208409 A1* | 7/2019 | Brisebois | H04W 8/245 |

* cited by examiner

US 10,708,720 B2

ENHANCED LOCATION SERVICE NEGOTIATION

CROSS-REFERENCE TO RELATED APPLICATIONS

This application is a U.S. National Stage Application under 35 U.S.C. 371 and claims the priority benefit of International Application No. PCT/US17/067709, filed Dec. 20, 2017, and Provisional Application No. 62/449,906, filed Jan. 24, 2017, the disclosures of which are incorporated herein by reference as if set forth in full.

TECHNICAL FIELD

This disclosure generally relates to systems and methods for wireless communications and, more particularly, to enhanced location service negotiation among wireless devices.

BACKGROUND

Wireless devices are becoming widely prevalent, making them suited for location-based services (e.g., location determinations). Wireless devices may benefit from location-based services that may result in an enhanced user experience. Recently, there has been a shift in technology to support location services between a wireless device and multiple access points.

DETAILED DESCRIPTION

Figure 1:
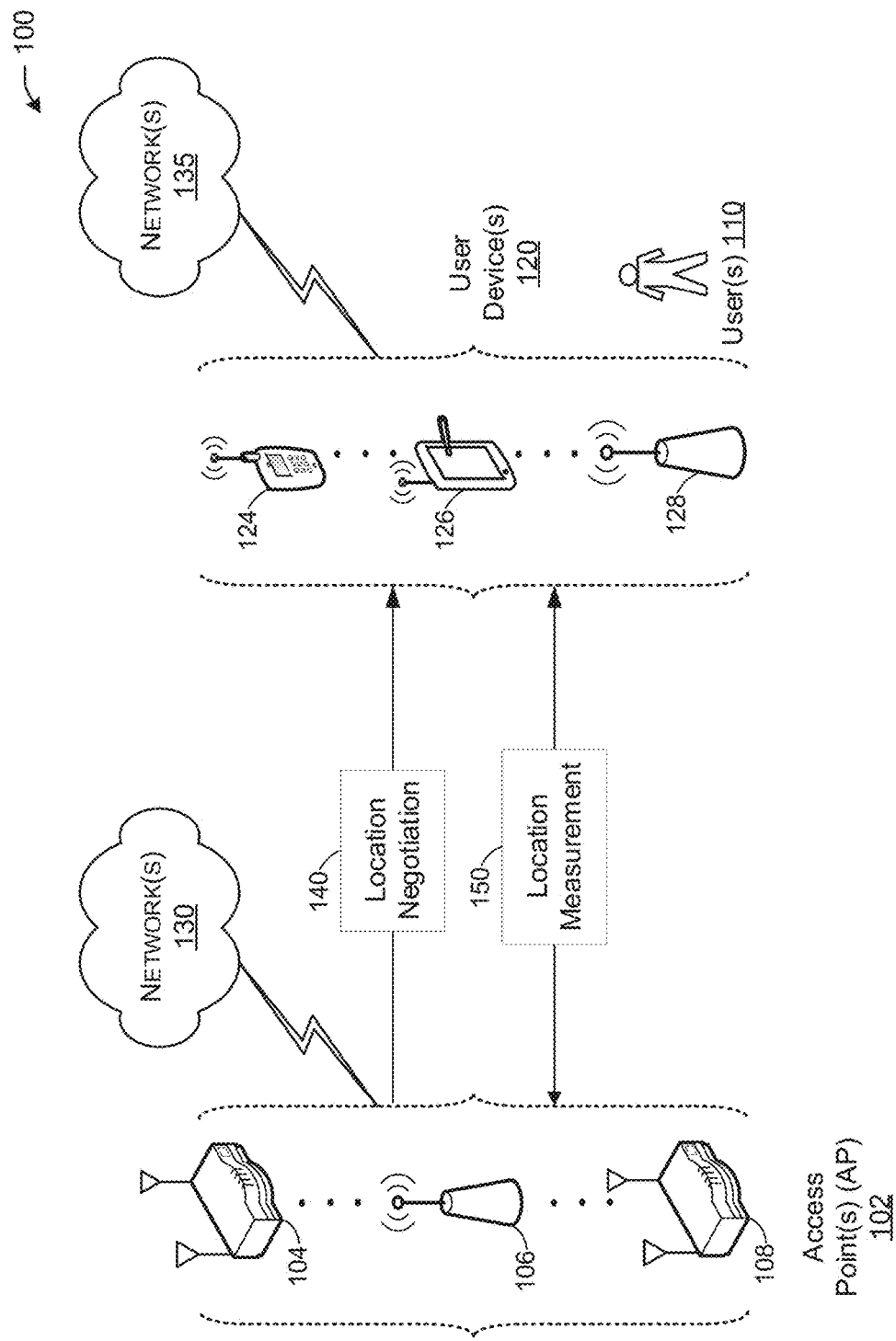
FIG. 1 depicts a network diagram illustrating an example network environment of an enhanced location service negotiation, in accordance with one or more example embodiments of the present disclosure.

Example embodiments described herein provide certain systems, methods, and devices for location determination, including, but not limited to, the IEEE 802.11 family of standards.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A Wi-Fi device may perform a timing measurement procedure, known as fine timing measurement (FTM), in order to allow the Wi-Fi device to obtain its range to another device, such as an access point (AP), a station (STA), or an FTM responder. Generally, the range of the Wi-Fi device to the another device is a distance between the two devices. The Wi-Fi devices can determine its distance (from the another device) by measuring a time it takes for, e.g., a packet or frame to travel from one device to another. The FTM procedure is an IEEE 802.11 protocol introduced to support location determination by a device based on range measurements to multiple known responding devices that can be associated or unassociated with the device. The device can execute, with the multiple known responding devices, location determination techniques, including triangulation, trilateration, etc.

Current location protocols consider multiple APs when (a) providing information as part of a neighbor report (a frame of an access network query protocol (ANQP)) to provide a STA with information of surrounding APs or (b) requesting range measurement to a specific set of APs. However, to conduct range measurements to APs specified in a neighbor report, the STA still needs to separately negotiate an FTM procedure with each AP in the APs during a negotiation phase. Conventionally, the negotiation phase comprises the STA performing an FTM negotiation with each AP in the APs to determine an identification (e.g., unique IDs (UIDs), associated IDs (AIDs), ranging AIDs (R-AIDs), etc.) that the STA can use during a subsequent measurement phase with the APs. In other words, a conventional FTM procedure is mostly used as a single input single output protocol. Separately negotiating the FTM procedure with each AP in the APs creates both delay and medium overhead as a new measurement capabilities exchange and resource allocation need to be established (between the STA and each AP).

Example embodiments of the present disclosure relate to systems, methods, and devices for enhanced location service negotiation.

In one embodiment, an enhanced location service negotiation system may define an enhanced FTM protocol for location measurement (e.g., FTM measurement, position service, etc.) between a group of coordinated APs and one STA. The group of coordinated APs can comprise APs that are in communication with each other (e.g., by a controller, over a communication protocol, etc.), to provide WLAN services to STAs that are associated with only one AP in the group of APs. STA may be either associated with only one of the APs of the group or unassociated to all the APs. Alternatively, the STA may be associated with some of the APs (but not all).

In one embodiment, an enhanced location service negotiation system comprises a group of coordinated APs that are each capable of transmitting, to the STA, an extended neighbor report (e.g., as a frame) that comprises location capability support information. The location capability support information comprises identification information that the STA uses when performing the FTM measurement to the group of coordinated APs. The location capability support information can be used by the STA to facilitate a negotiation phase of an enhanced location service negotiation system. Particularly, the STA can identify an extended neighbor report that is transmitted by an AP in the group of coordinated APs; determine identification information for the STA; and perform location measurements with the group of coordinated APs using the determined identification.

With particularity regarding the location capability support information of the extended neighbor report, the location capability support information facilitates FTM negotiation between the STA and each AP in the group of coordinated APs, not only a single AP (in the group of coordinated APs) that is serving the STA. The location capability support information can be a modified portion (or an additional portion) of a conventional neighbor report (e.g., the Neighbor Report defined in IEEE 802.11k) that comprises information indicating capabilities of each AP in the group of coordinated APs. The location capability support information can comprise a R-AID that can be assigned to the STA and valid, when the STA performs FTM measurement, for each AP in the group of coordinated APs. The R-AID can be assigned so that it is unique to the STA and may not correspond to an associated ID (AID) of another STA associated to another AP of the group of coordinated APs or to another unassociated STA within the group. This may require coordination among the group of coordinated APs.

A keep-alive timeout may define a time period after which the R-AID (assigned to the STA) is no longer valid, unless the STA and an AP in the group of coordinated APs performs a successful frame exchange, in which case the keep-alive timeout is reset to an original value. An AP in the group of coordinated APs may define the original value during the negotiation phase. The original value, alternatively, can be advertised in beacons and probe responses.

In one embodiment, the R-AID may be, alternatively, only valid per the AP (that transmits the extended neighbor report) for the STA, but multiple R-AIDs may be temporarily assigned to the STA with the extended neighbor report. The extended neighbor report can comprise information regarding neighbor APs (in the group of coordinated APs) with which location measurements are possible for the STA. To this end, the location capability support information can comprise, for each AP of the neighbor APs, additional R-AIDs that the STA may use to perform location measurement with the each AP of the neighbor APs. The location capability support information can also comprise one or more keep-alive timeouts for the additional R-AIDs when the extended neighbor report is unicasted to the STA. If the neighbor report is broadcasted by an AP in the group of coordinated APs, the broadcasting AP can include, in the location capability support information of the extended neighbor report, a range of R-AIDs that the STA can use if the STA is to perform location measurement (with each AP in the group of coordinated APs).

In one embodiment, the location capability support information can, for each AP in the group of coordinated APs, additionally comprise: (1) a type of location services available at neighbor APs (e.g., Single-User (SU)/Multi-User (MU) High Efficiency (HE) range, angular, scalable mode); (2) a time difference in a traffic filtering service (TFS) between a reporting AP and a neighbor AP; (3) a target beacon transmission time (TBTT) that is a time at which an AP should send its beacons; (4) a target time of service periods for location service for a negotiation phase or a measurement phase (e.g., a target wait time (TWT) between measurement resource requests opportunities at a neighbor AP); and (5) capabilities for location service. Based on the aforementioned location capability support information, the STA may improve its scanning and AP selection for concurrent operation of location measurements and data transmissions.

In one embodiment, once a negotiation phase of an enhanced location service negotiation system is established (e.g., a STA has determined its R-AID), the STA may then choose one or more possible opportunities for a measurement phase using a trigger frame (TF) short feedback, which may meet positioning requirements and scheduling constraints of a group of coordinated APs. If a location measurement is not requested by the STA using the R-AID in an FTM Resource Request mechanism (e.g., using a Null Data Packet (NDP) Short Feedback for FTM measurement), then the aforementioned R-AID is released and a new negotiation phase of the enhanced location service negotiation system is established.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment of an enhanced location service negotiation, according to some example embodiments of the present disclosure. Wireless network 100 may include one or more user devices 120 (e.g., user devices 122, 124, 126) and one or more access points(s) (AP) 102, which may communicate in accordance with IEEE 802.11 communication standards. The user device(s) 110 may be mobile devices that are non-stationary (e.g., not having fixed locations) or may be stationary devices.

Figure 8:
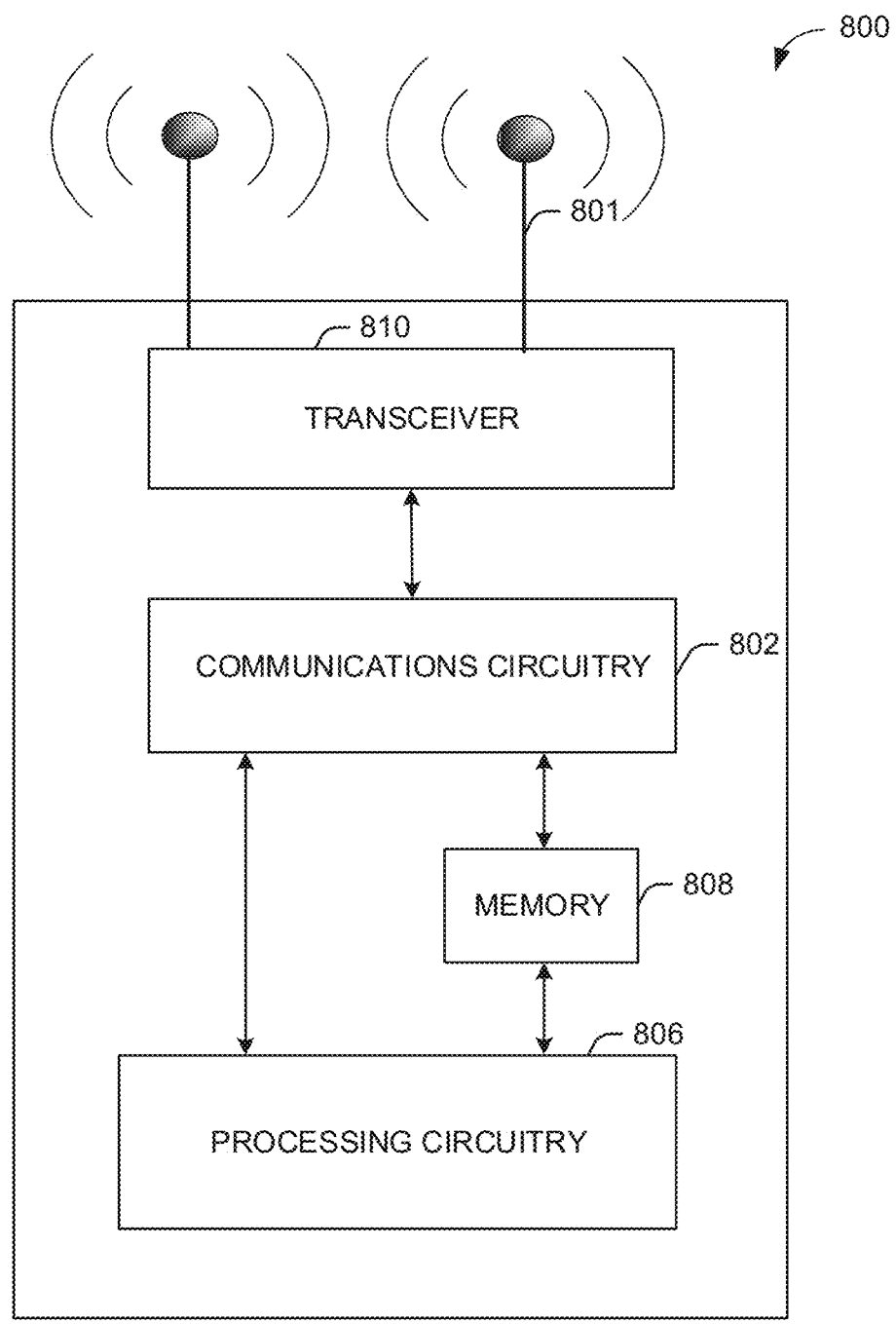
FIG. 8 illustrates a functional diagram of an example communication station that may be suitable for use as a user device, in accordance with one or more example embodiments of the present disclosure.
Figure 9:
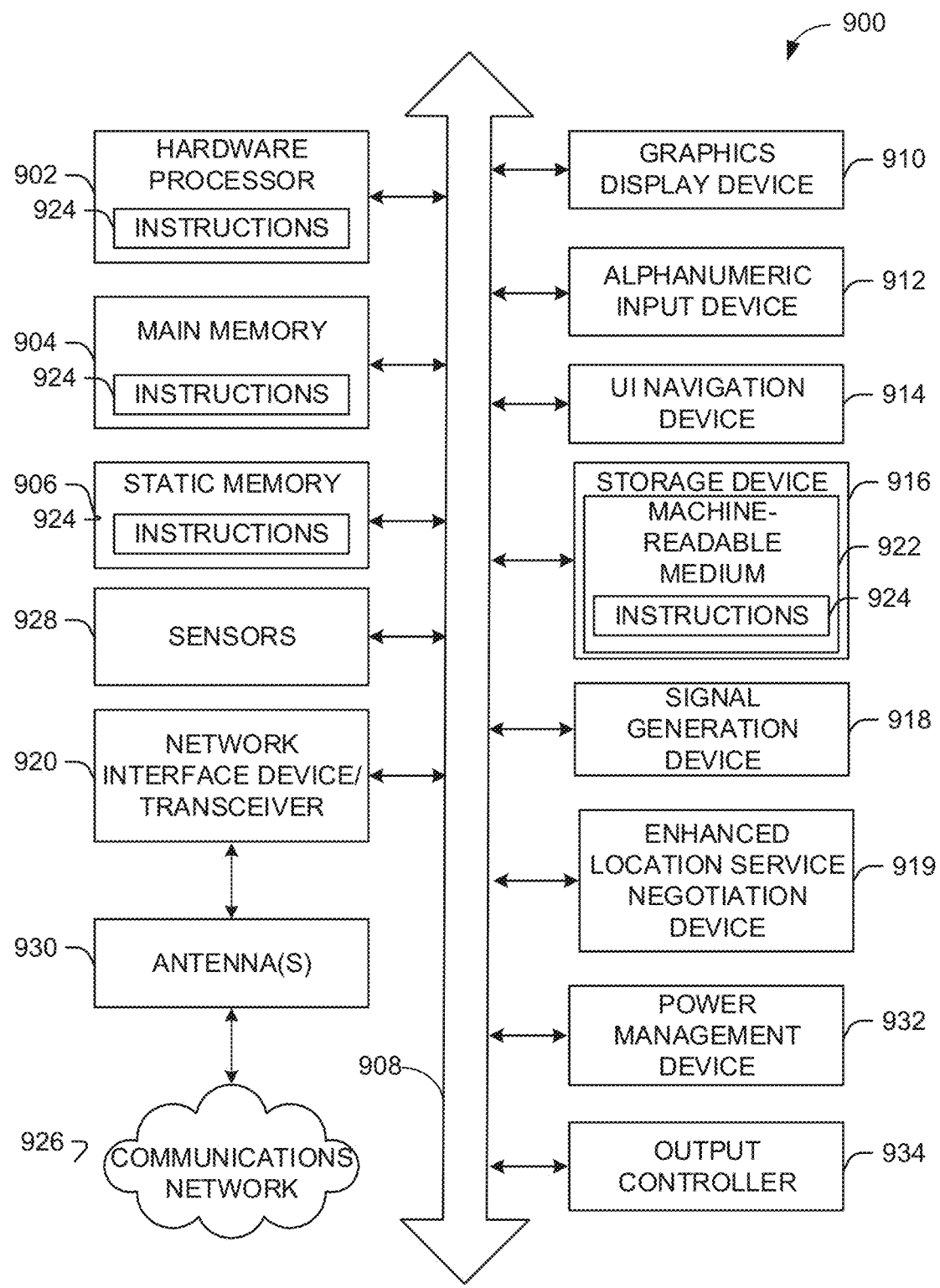
FIG. 9 is a block diagram of an example machine upon which any of one or more techniques (e.g., methods) may be performed, in accordance with one or more example embodiments of the present disclosure.

In some embodiments, the user devices 110 and the one or more APs 102 may include one or more computer systems similar to that of the functional diagram of FIG. 8 and/or the example machine/system of FIG. 9.

One or more illustrative user device(s) 120 and/or AP 102 may be operable by one or more user(s) 110. It should be noted that any addressable unit may be a station (STA). A STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device (s) 120 and/or AP 102 may operate as a personal basic service set (PBSS) control point/access point (PCP/AP). The user device(s) 120 (e.g., 122, 124, 126) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP 102 may also include mesh stations in, for example, a mesh network, in accordance with one or more IEEE 802.11 standards and/or 3GPP standards.

Any of the user device(s) 120 (e.g., user devices 122, 124, 126), and AP 102 may be configured to communicate with each other via one or more communications networks 130 and/or 135 wirelessly or wired. The user device(s) 120 may also communicate peer-to-peer or directly with each other with or without the AP 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 122, 124, 126) and AP 102 may include one or more communications antennas. The one or more communications antennas may be any suitable type of antennas corresponding to the communications protocols used by the user device(s) 120 (e.g., user devices 122, 124, 126) and the AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 122, 124, 126) and AP 102 may be configured to perform directional transmission and/or directional reception in conjunction with wirelessly communicating in a wireless network. Any of the user device(s) 120 (e.g., user devices 122, 124, 126), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 122, 124, 126), and AP 102 may be configured to perform any given directional transmission towards one or more defined transmit sectors. Any of the user device(s) 120 (e.g., user devices 122, 124, 126), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 122, 124, 126) and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP 102) establishes communication with one or more user devices 120 (e.g., user devices 122, 124, and/or 126), the AP 102 may communicate in a downlink direction and the user devices 120 may communicate with the AP 102 in an uplink direction by sending data frames in either direction. The user devices 120 may also communicate peer-to-peer or directly with each other with or without the AP 102.

In one embodiment, and with reference to FIG. 1, a user device 120 may perform location negotiation 140 with one or more AP(s) 102. User device 120 may be considered as an initiating device, also referred to as a station device (STA), and at least one of the AP 102 may be considered as a responding device.

With reference to FIG. 1, one or more user devices 120 may desire to obtain its range from another device (e.g., the one or more APs 102). In one embodiment, the one or more APs 102 can comprise a first coordinated AP 104, a second coordinated AP 106, and a third coordinated AP 108 that allow the one or more user devices 120 to use enhanced location service negotiation. The first coordinated AP 104, the second coordinated AP 106, and the third coordinated AP 108 can be coordinated, e.g., in a proprietary manner, by a controller-based method, or by an over the air method, etc., to provide services (e.g., location determination) to the one or more user devices 120. Further, the one or more user devices 120 can perform a location determination when (a) it is associated with only one coordinated AP (e.g., the first coordinated AP 104, the second coordinated AP 106, or the third coordinated AP 108) or (b) unassociated with all the coordinated APs in one or more APs 102.

In one embodiment, there may be two phases associated with the one or more devices 120 performing the location determination with the one or more APs 102: a negotiation phase and a measurement phase. The negotiation phase can be when the one or more user devices 120 and the one or more APs may exchange capabilities and negotiate type(s) of measurements to be determined. An enhanced location service negotiation system may use a location negotiation frame 140 to facilitate the negotiation phase. This phase may be done only once. Subsequent to the (first) negotiation phase, the measurement phase can be when the one or more user devices 120 and the one or more APs 102 may perform measurements (e.g., by performing FTM procedures). The enhanced location service negotiation system may use an exchange of at least one location measurement frame 150 to facilitate the measurement phase. These measurements may be done multiple times.

In one embodiment, an enhanced location service negotiation system allows the one or more user devices 120 to perform the negotiation phase with each coordinated AP in the one or more APs 102 using the location negotiation frame 140. The location negotiation frame 140 can be unicasted or broadcasted by each of the one or more APs 102. In the enhanced location service negotiation system, the location negotiation frame 140 can comprise a neighbor report frame that comprises location capability support information. The location capability support information comprises identification information that the one or more user devices 120 uses when performing the FTM measurement to the one or more APs 102. The location capability support information facilitates the negotiation phase between the one or more devices 120 and each coordinated AP in the one or more APs, not just an individual coordinated AP.

In one embodiment, the location capability support information can be a modified portion (or an additional portion) of a conventional neighbor report (e.g., the Neighbor Report defined in IEEE 802.11k) that comprises information indicating capabilities of the one or more APs 102. Conventionally, a neighbor report comprises (1) the basic service set identifiers (BSSIDs) of APs from a group of APs that support location services; and (2) for each AP in the group of APs, a channel on which the each AP operates. In the enhanced location service negotiation system, the location capability support information (of an extended neighbor report) can further comprise an R-AID that can be (a) assigned to a user device (e.g., user devices 122, 124, and/or 126) of the one or user devices 112 and (b) valid, when the user device (122, 124, or 136) performs FTM measurements with each coordinated AP in the one or more APs 102. The R-AID can be assigned so that it is unique to a user device (e.g., user devices 122, 124, and/or 126) and may not correspond to an AID of another user device (that is associated to a coordinated AP of the one or more APs 102) or to another unassociated user device. In such embodiment, the R-AID can be a same value for each coordinated AP (e.g., the first coordinated AP 104, the second coordinated AP 106, and the third coordinated AP 108) in the one more APs 102. The user device (e.g., user devices 122, 124, and/or 126) can use the R-AID when performing the measurement phase with the one or more APs 102.

In one embodiment, the R-AID may be, alternatively, only valid per a coordinated AP in the one or more APs 102, but multiple R-AIDs may be temporarily assigned to the user device (e.g., user devices 122, 124, and/or 126) with the extended neighbor report. The extended neighbor report can comprise information regarding each coordinated AP in the one or more APs 102 with which location measurements are possible for the user (e.g., user devices 122, 124, and/or 126). To this end, the location capability support information can comprise, for each coordinated AP (e.g., the first coordinated AP 104, the second coordinated AP 106, and the third coordinated AP 108), a R-AID that the user device (e.g., user devices 122, 124, and/or 126) may use during the measurement phase. Additionally, the location capability support information can comprise, for each coordinated AP (e.g., the first coordinated AP 104, the second coordinated AP 106, and the third coordinated AP 108) in the one or more APs 102, a range of R-AIDs that the user devices 120 can use to perform location measurements with each of the coordinated APs. Thus, in such embodiment, the multiple R-AIDs can be different values (on a per coordinated AP basis) or a same value for some of the coordinated APs.

In one embodiment, the location capability support information (of the extended neighbor report), can comprise, for each coordinated AP in the one or more APs 102: (1) a type of location services available at a coordinated AP in the one or more APs 102 (e.g. SU/MU HE range, angular, scalable mode); (2) a time difference in the TFS between the coordinated AP and another coordinated AP in the one or more APs 102; (3) a TBTT: a time at which the coordinated AP should send its beacons; (4) a target time of service periods for location service for the negotiation phase or the measurement phase (e.g., a TWT between measurement resource requests opportunities at the another coordinated AP); and (5) capabilities for location service. Based on that information, the one or more user devices 120 may improve its scanning and coordinated AP selection for concurrent operation of location measurements and data transmissions.

In one embodiment, the location capability support information can comprise a keep-alive timeout that define a time period (e.g., a numerical value in seconds, minutes, etc.) after which the R-AID, assigned to the user device (e.g., user devices 122, 124, and/or 126) is no longer valid, unless the user device (e.g., user devices 122, 124, and/or 126) and a coordinated AP (in the one or more APs 102) performs a successful frame exchange, in which case the keep-alive timeout is reset to an original value. A coordinated AP in the one or more APs 102 may define the original value during the negotiation phase. The original value, alternatively, can be advertised in beacons and probe responses.

In one embodiment, after the user device (e.g., user devices 122, 124, and/or 126) has determined a R-AID (or multiple R-AIDs) based on the extended neighbor report, the user device may perform the measurement phase of the enhanced location service negotiation system using the R-AID. The R-AID (or the multiple R-AIDs) allows the user device to operate in DL and UL MU mode with the one or more APs 102 to determine location measurements with the one or more APs 102. As will be described in greater detail herein below, the location measurements can comprise, e.g., FTM measurements, position services, etc.

Figure 2:
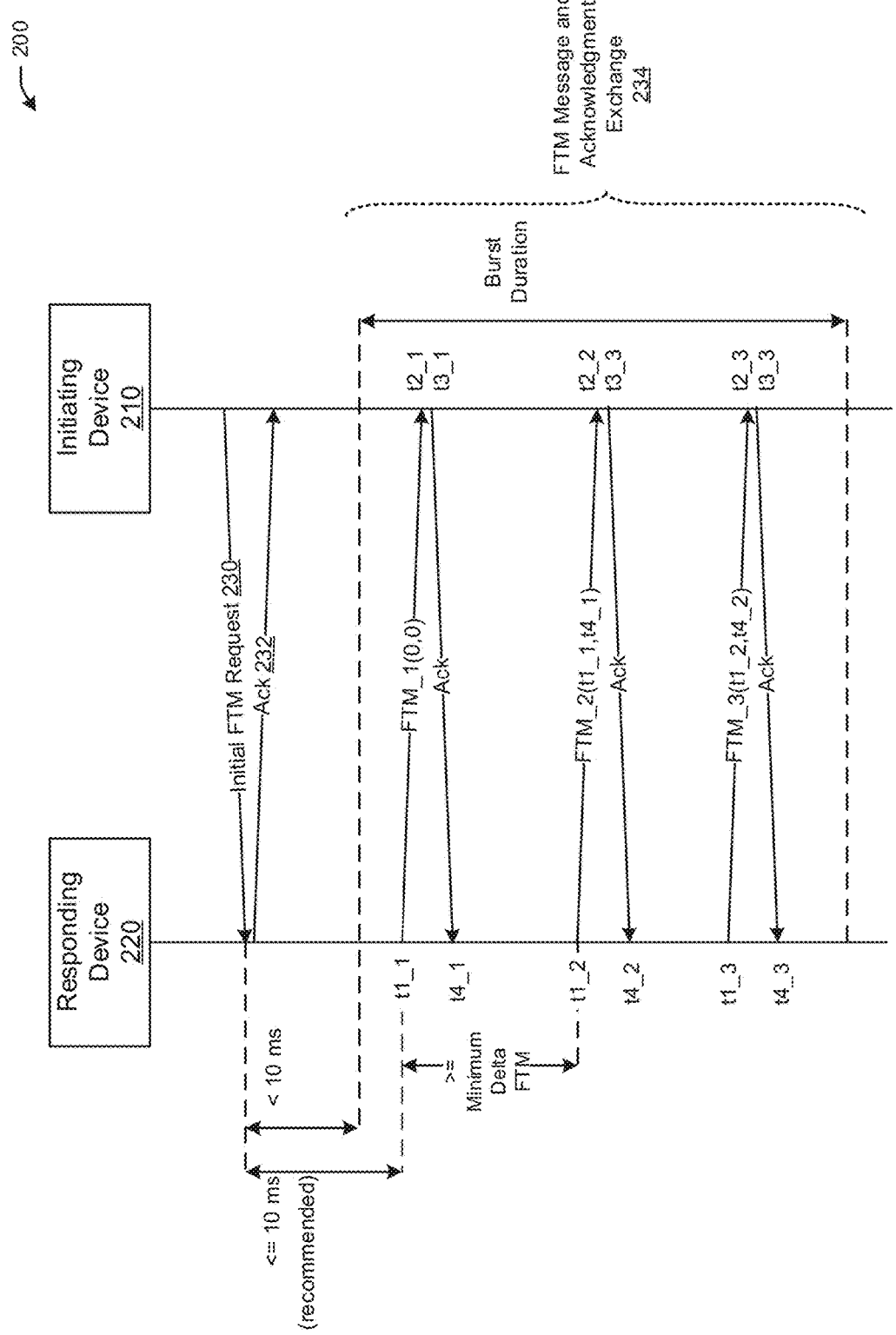
FIG. 2 depicts an illustrative diagram for location determination using fine timing measurement (FTM), in accordance with one or more example embodiments of the present disclosure.

FIG. 2 depicts an illustrative flow diagram location determination using FTM, in accordance with one or more example embodiments of the present disclosure.

The example of FIG. 2 is an example negotiation and measurement exchange sequence 200 between an initiating device 210 (e.g., a coordinated AP) and a responding device 220 (e.g., a user device) for a single burst instance, where an As Soon As Possible (ASAP) field=1 and an FTMs per Burst field=3. The initiating device 210 and the responding device 220 may be associated or unassociated with one another.

In the example shown in FIG. 2, after the responding device 220 (at a negotiation phase) determines a R-AID (assigned to it or associated with it) based on an extended neighbor report, the initiating device 210 device may perform FTM measurements with the responding device 220. Specifically, the initiating device 210 may cause to send an initial FTM request 230 to the responding device 220 that comprises the R-AID. The responding device 220 may identify the initial FTM request 230 based on the R-AID. Further, the responding device 220 may cause to send, in response, an acknowledgment 232 of the initial FTM request 230. Subsequently, a series of FTM messages and acknowledgements 234 may be exchanged between the initiating device 210 and the responding device 220 using a timing synchronization function, where time measurements are taken (that correspond to how much time it takes to receive an acknowledgement based on a particular FTM measurement). The series of FTM messages and acknowledgments 234 can comprise physical layer (PHY) protocol data units (PPDUs), NDPs, etc. The initiating device 210 can compute a round trip time and a clock offset. A distance (e.g., location measurement) from the responding device 220 to the initiating device 210 can be derived based on the time measurements. It is understood that the above is only an example meant for illustrative purposes.

Figure 3:
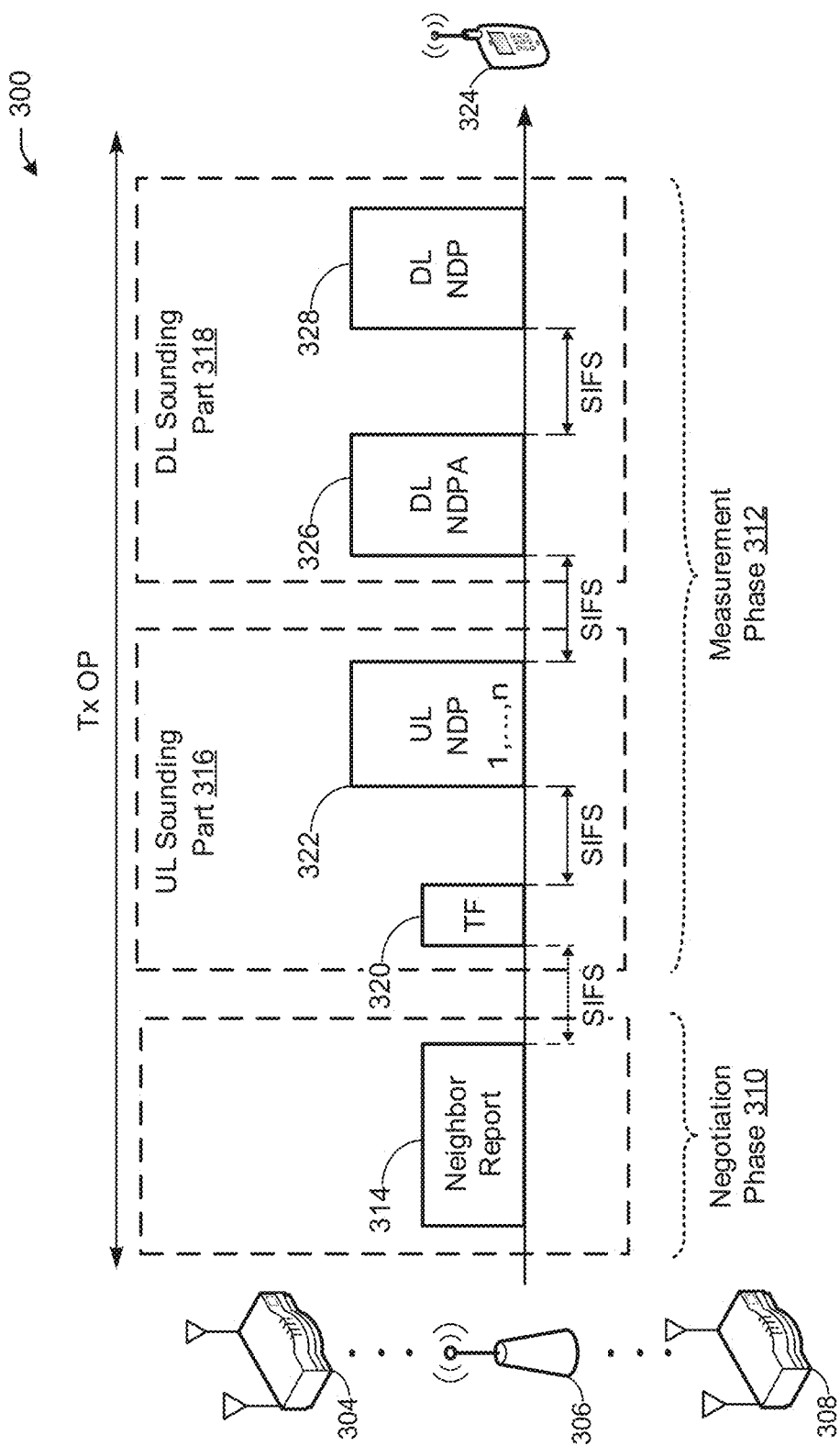
FIG. 3 depicts an illustrative flow diagram for enhanced location service negotiation, in accordance with one or more example embodiments of the present disclosure.

FIG. 3 depicts an illustrative schematic diagram for enhanced location service negotiation, in accordance with one or more example embodiments of the present disclosure.

Referring to FIG. 3, there is shown an exemplary measurement protocol 300 for the enhanced location service negotiation between a first coordinated AP 306 and a user device 324 (e.g., a STA) that can use UL MU and DL MU operations, where the enhanced location service negotiation comprises a negotiation phase 310 and a measurement phase 312. The first coordinated AP 306 can be coordinated with a second coordinated AP 304 and a third coordinated AP 308 (e.g., to provide WLAN services to the user device 324). The user device 324 may be unassociated or associated with the first coordinated AP 306.

Generally, the negotiation phase 310 can be when the user device 324 and the first coordinated AP 306 exchange capabilities and negotiate type(s) of measurements to be determined for location measurement. In the example shown in FIG. 3, during the negotiation phase 310, the first coordinated AP 306 can be configured to broadcast (or unicast) a neighbor report 314 (e.g., in a location negotiation frame) that comprises location capability support information. The location capability support information comprises identification information that the user device 324 can use when performing a FTM measurement or UL/DL sounding to the first coordinated AP 306. The user device 324 can identify neighbor report 314 and determine the location capability support information to facilitate the negotiation phase 310 between the user device 324 and the first coordinated AP 306 as well as the second coordinated AP 304 and the third coordinated AP 308 (that are coordinated among each other).

The location capability support information can comprise a R-AID that can be assigned to the user device 324 and valid when the user device 324 performs FTM measurement or UL/DL sounding with the first coordinated AP 306. The R-AID can be assigned so that it is unique to the user device 324 and may not correspond to an AID of another user device associated to the second coordinated AP 304 or to the third coordinated AP 308, or to another unassociated user device. In one embodiment, the R-AID the user device 324 can use the R-AID when performing FTM measurements or UL/DL sounding with the second coordinated AP 304 and the third coordinated AP 308.

In one embodiment, the R-AID may be, alternatively, only valid for the first coordinated AP 306 (that transmits the neighbor report 314) for the user device 324, but multiple R-AIDs may be temporarily assigned to the user device 324 with the neighbor report 314. The neighbor report 314 can comprise information regarding the second coordinated AP 304 and the third coordinated AP 308. To this end, the location capability support information can comprise, for the second coordinated AP 304 and the third coordinated AP 308, additional R-AIDs that the user device 324 may use to perform location measurement or UL/DL sounding with the second coordinated AP 304 and the third coordinated AP 308.

Subsequent to the negotiation phase 310, the measurement phase 312 can be when the user device 324 and the first coordinated AP 306 perform location measurements (e.g., by performing FTM procedures or UL/DL sounding). Particularly, in FIG. 3, a context of channel access mechanisms for the user device 324 and the first coordinated AP 306 for UL MU and DL MU is shown, where the channel access mechanisms comprise a UL sounding part 316 and a DL sounding part 318. In the UL sounding part 316, the user device 324 (and other user devices) may be triggered by the first coordinated AP 306 to send UL trigger-based MU PPDUs or NDPs. To initiate this sequence, the first coordinated AP 306 may send a trigger frame 320, indicating the R-AID that has been associated with/assigned to the user device 324 and resource allocations of the user device 324. In a conventional measurement protocol, in order to participate in the multi-user positioning illustrated in the measurement phase 312, STAs associated with the first coordinated AP 306, contrastingly, may need to have a UID and unassociated STAs may need to have an AID.

Subsequent to the first coordinated AP 306 sending the trigger frame 320, the first coordinated AP 306 may cause to send UL NDPs 322 to user devices, including the user device 324. The UL NDPs may include the R-AID that has been assigned to the user device 324, and the user device may identify a UL NDP (in the UL NDPs) based on the R-AID. Short interframe service (SIFS) periods may occur between AP transmissions as shown in FIG. 3.

After the UL sounding part 316, the DL sounding part 318 can occur. In the DL sounding part 318, the first coordinated AP 306 may cause to send a DL Null Data Packet Announcement (NDPA) 326 and a DL NDP 328 as pilot tones to the user devices, including the user device 324. The pilot tones can be used by the user device 324 (and other user devices) to estimate the channel and perform location measurements. It is understood that the above descriptions are for purposes of illustration and are not meant to be limiting.

Figure 4:
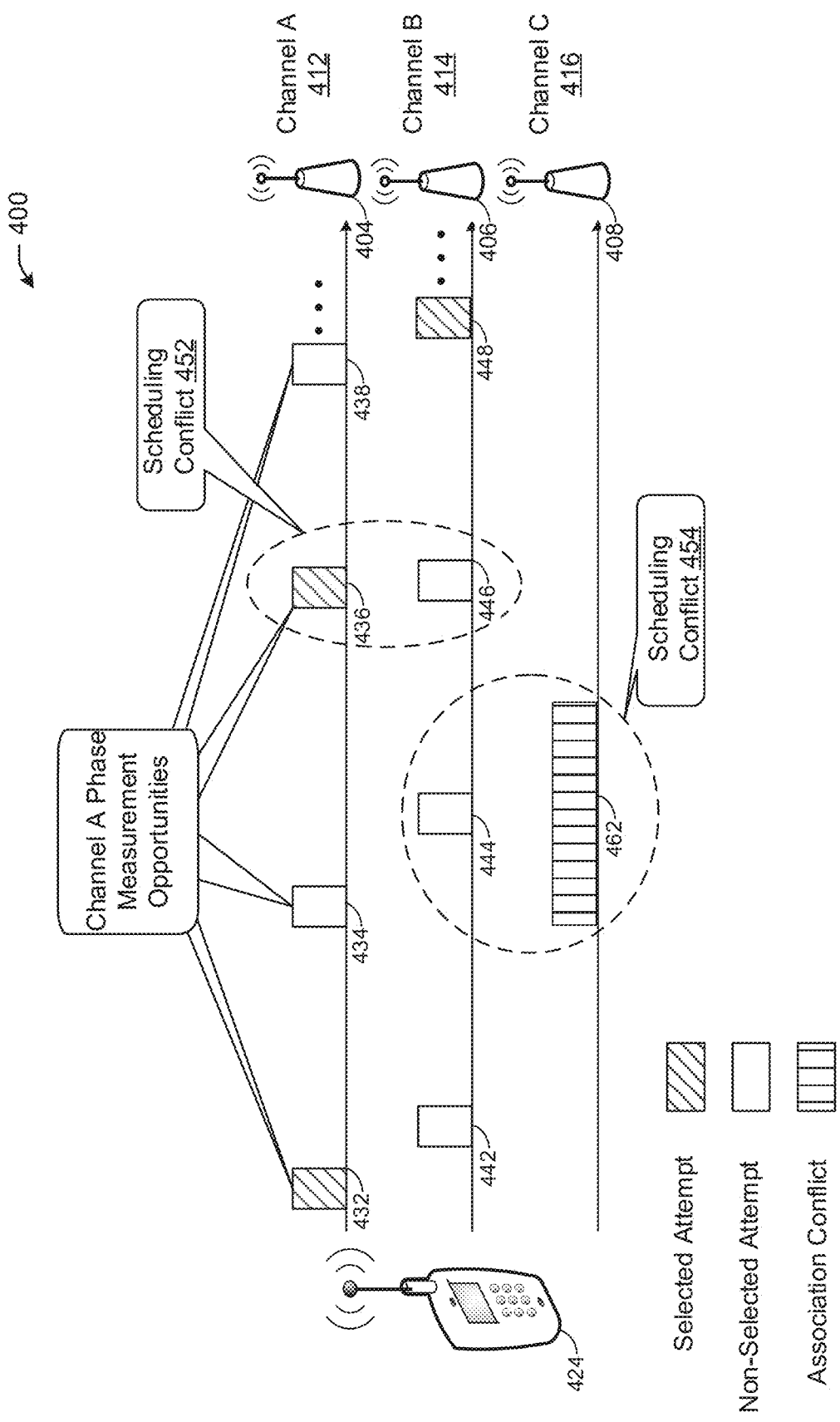
FIG. 4 depicts illustrative selected opportunities for multi-channel operation.

FIG. 4 depicts an illustrative schematic diagram 400 for selected opportunities for multi-channel operation.

Referring to FIG. 4, there is shown an exemplary scheduling and association activity where a user device 424 may perform location measurements with a first coordinated AP 404, a second coordinated AP 406, and a third coordinated AP 408 over, respectively, three distinct channels: channel A 412, channel B 414, and channel C 416. The user device 424 may choose from the set of opportunities a subset which meets its scheduling limitations (e.g., periods of conflicts between resources), accuracy requirements, and movement of the user device 424 (e.g., positioning requirements). Conventionally, the user device 424 is to perform a location measurement attempt (e.g., a measurement phase opportunity) in a time period on a single channel (e.g., the channel A 412, the channel B 414, or the channel C 416) that is non-overlapping with (a) attempts on other channels or (b) association conflicts on other channels.

With the introduction of HE-MU mode as one of the predominant modes of the upcoming 802.11ax or next generation Wi-Fi (Next Gen) the resulting scheduling mechanism enhances the effect where access to the channel using the legacy CSMA/CA gets lower probability. This probability may be even lower the more the medium becomes congested. Thus, meeting positioning requirements and scheduling constraints of coordinated APs in an enhanced location service negotiation system can be difficult.

As shown in FIG. 4, one or more attempts may be allocated to the user device 424 (e.g., a first attempt 432, a second attempt 434, a third attempt 436, and a fourth attempt 438) on the channel A 412. Further, the user device 424 may be allocated certain attempts (e.g., a first attempt 442, a second attempt 444, a third attempt 446, and a fourth attempt 448) on the channel B 414. In the example of FIG. 4, there are no attempts available for the user device 424 on the channel C 416.

As earlier stated, because the user device 424 is to perform an attempt on a channel when it is non-overlapping with other attempts, scheduling conflicts 452, 454 can occur. A first scheduling conflict 452 occurs when the third attempt 436 (that is selected) on the channel A 412 and the third attempt 446 on the channel B 414 overlap. A second scheduling conflict occurs 454 when the second attempt 444 on the channel B 414 overlaps with an association conflict 462 on the channel C 416. FIG. 4 additionally shows the first attempt 432 (that is selected) on the channel A 412 and the fourth attempt 448 (that is selected) on the channel B 414 as being non-overlapping phase measurement opportunities where location measurements can be performed by the user device 324. It is understood that the above descriptions are for purposes of illustration and are not meant to be limiting.

Figure 5:
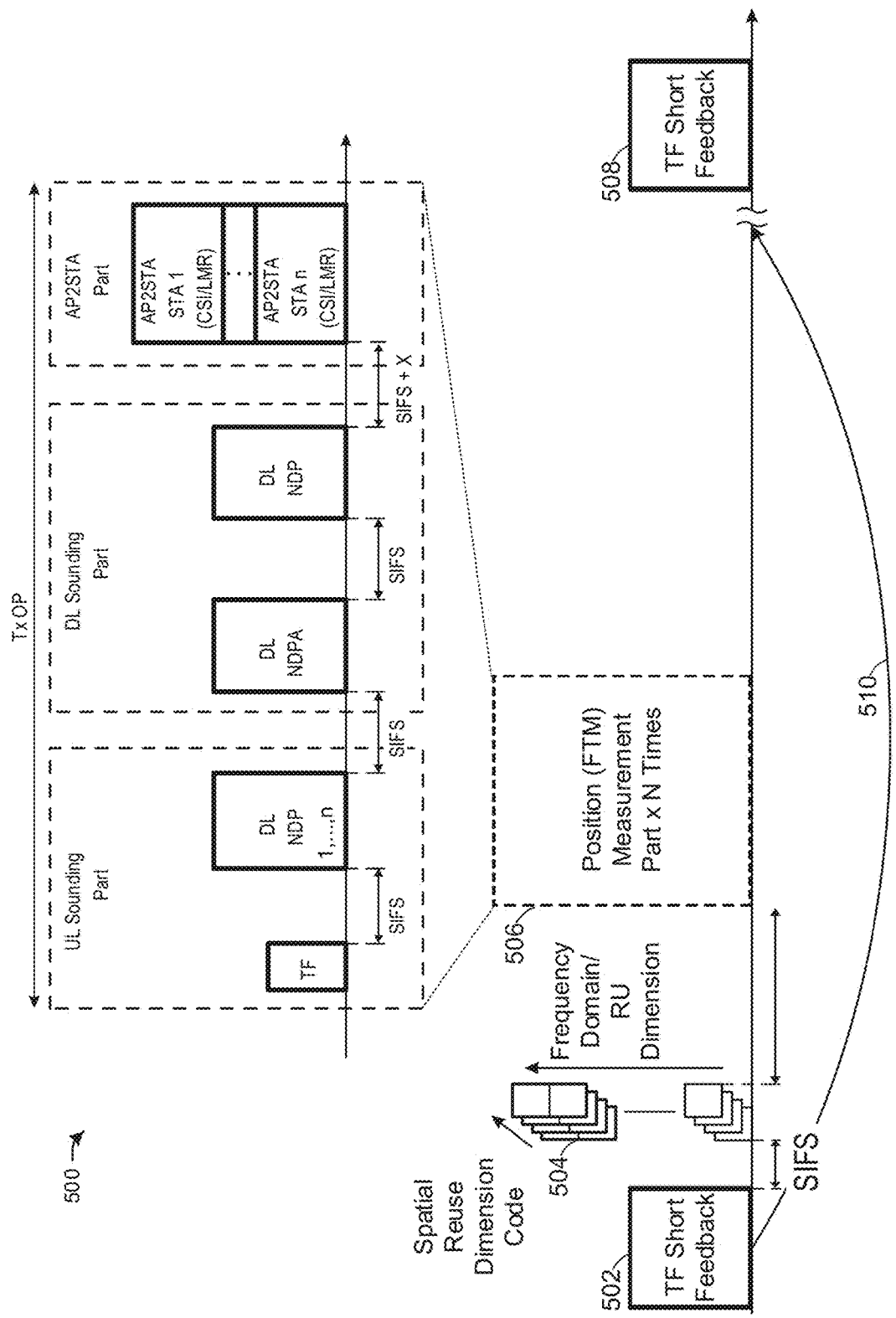
FIG. 5 depicts an illustrative schematic diagram for enhanced location service negotiation.

FIG. 5 depicts an illustrative schematic diagram 500 for enhanced location service negotiation.

Referring to FIG. 5, there is shown an enhanced location service negotiation system 500 that comprises an AP causing to send a TF short feedback followed by a measurement phase. In one embodiment, after the AP has completed a negotiation phase with one or more STAs, the AP can be configured to cause to send a first TF short feedback (e.g., a frame) 502 that comprises location measurement identifications (e.g., R-AIDs, AIDs, or UIDs) of the one or more STAs. The first TF short feedback 502 can allow the AP and the one or more STAs to meet positioning requirements and avoid scheduling conflicts (as described along with FIG. 4) that may arise during location determinations. Particularly, the one or more STAs can respond (e.g., in a response frame) to the first TF short feedback 502 to indicate that the one or more STAs have capabilities and availability to perform a location measurement (or fail to reply for, e.g., being out of range or unavailable). Based on the response of the one or more STAs, the AP can allocate a space reuse code dimension 504 (e.g., frequency domains, RU dimensions, etc.) to the one more STAs that indicated that they are available to perform the timing measurement. The space reuse code dimension 504 can comprise measurement phase opportunities to the one or more STAs that do not conflict with other measurement phase opportunities. Subsequently, the AP may perform a measurement phase 506 that is substantially similar to what is described along with FIG. 3. More particularly, the AP may be configured to perform location measurements and/or UL/DL sounding with the one or more STAs, wherein frames comprise R-AIDs that have been assigned to the one more STAs through a neighbor report. Following the measurement phase 506, the STA may cause to send a second TF short feedback 508 (that determines whether the one or more APs are available for another measurement phase). A reference to timing of one or more future short feedback allocation 510 may be used in between the first TF short feedback 502 and the second TF short feedback 508.

In one embodiment, if location measurement is not requested by the user device using the R-AID in an FTM Resource Request mechanism (e.g., using a NDP Short Feedback for FTM measurement), then the aforementioned R-AID is released and a new negotiation phase of the enhanced location service negotiation system is established. It is understood that the above descriptions are for purposes of illustration and are not meant to be limiting.

Figure 6:
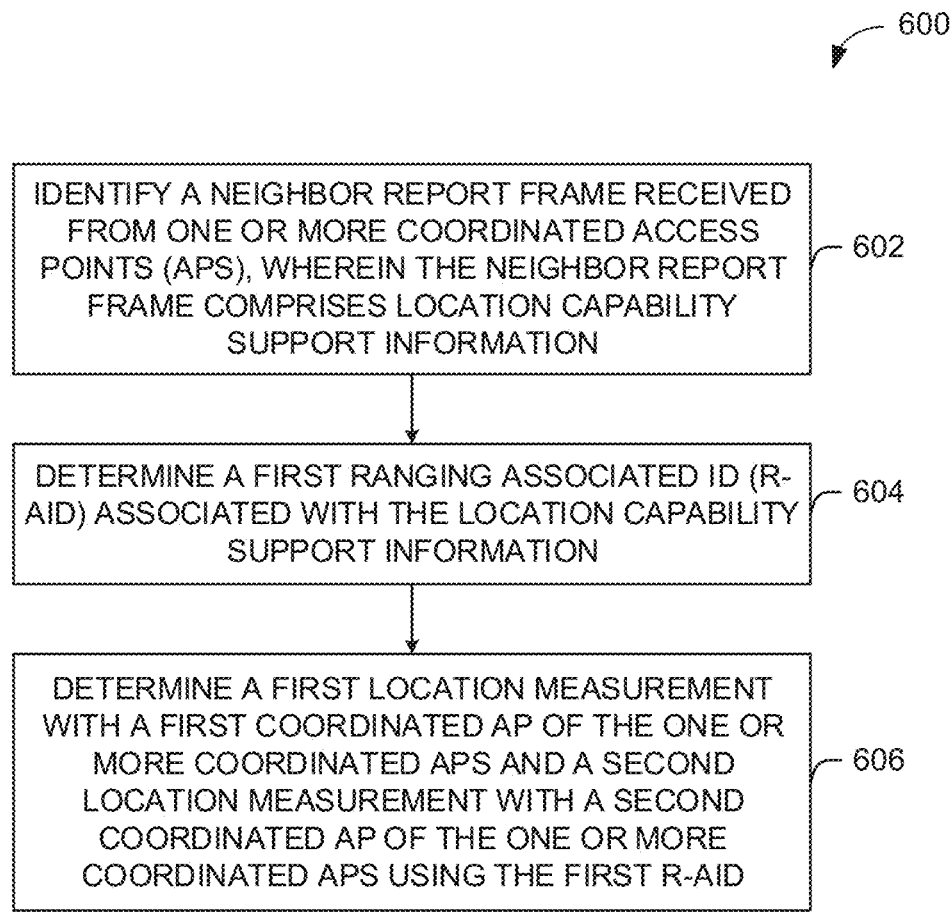
FIG. 6 depicts a flow diagram of an illustrative process for enhanced location service negotiation, in accordance with one or more example embodiments of the present disclosure.

FIG. 6 illustrates a flow diagram of illustrative process 600 for an illustrative enhanced location service negotiation system, in accordance with one or more example embodiments of the present disclosure.

At block 602, a device may identify a neighbor report frame received from one or more coordinated APs, wherein the neighbor report frame comprises location capability support information. For example, the location capability support information comprises identification information that the device can use when performing an FTM measurement with the one or more of coordinated APs. The location capability support information can be used by the device to facilitate a negotiation phase of an enhanced location service negotiation system. The location capability support information can be a modified portion (or an additional portion) of a conventional neighbor report (e.g., the Neighbor Report defined in IEEE 802.11k) that comprises information indicating capabilities of each AP in the one or more coordinated APs.

At block 604, the device may determine a first R-AID associated with the location capability support information. Particularly, the location capability support information can comprise the first R-AID that can be assigned to the device and valid, when the device performs FTM measurement, for each AP in the one or more coordinated APs. The first R-AID can be assigned so that it is unique to the STA and may not correspond to an associated ID (AID) of another STA associated to another AP of the one or more coordinated APs or to another unassociated STA within the one or more coordinated APs. Alternatively, the location capability support information can comprise, for each AP of the one or more coordinated APs, multiple R-AIDs (or a range of R-AIDs) that the STA may use to perform location measurement with the each AP of the one or more coordinated APs. Thus, the multiple R-AIDs can be different values (on a per coordinated AP basis) or a same value for some of the coordinated APs. The device can determine that first R-AID based on the location capability support information. The location capability support information may additionally comprise a keep-alive timeout(s) that can be associated with the (multiple) R-AIDs.

At block 606, the may device determine a first location measurement with a first coordinated AP of the one or more coordinated APs and a second location measurement with a second coordinated AP of the one or more coordinated APs using the first R-AID. For example, the device can perform a measurement phase with the one more coordinated APs. Particularly, as described above, the device may determine the first location measurement and the second location measurement using a location determination using FTM and/or measurement protocol. Further, the device may, prior to determining the first location measurement or the second location measurement, receive a TF short feedback from the one or more coordinated APs to, e.g., avoid scheduling conflicts and meet positioning requirements. It is understood that the above descriptions are for purposes of illustration and are not meant to be limiting.

Figure 7:
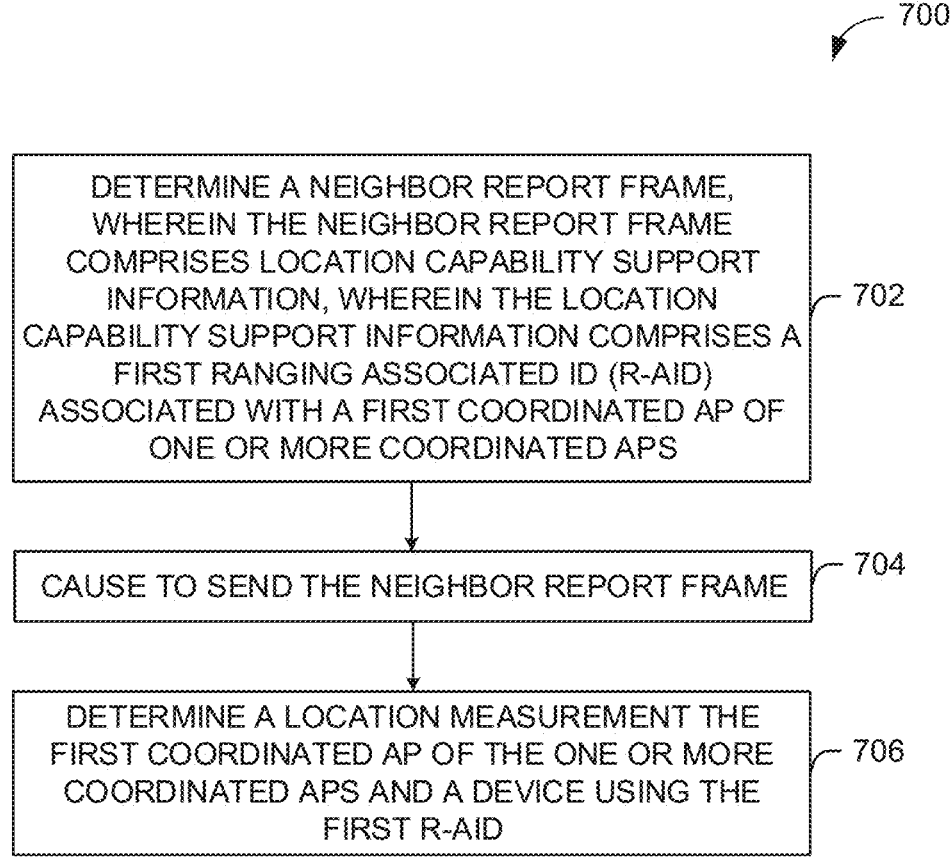
FIG. 7 depicts a flow diagram of an illustrative process for enhanced location service negotiation, in accordance with one or more example embodiments of the present disclosure.

FIG. 7 illustrates a flow diagram of illustrative process 700 for an illustrative enhanced location service negotiation system, in accordance with one or more example embodiments of the present disclosure.

At block 702, a device may determine a neighbor report frame, wherein the neighbor report frame comprises location capability support information, wherein the location capability support information comprises a first R-AID associated with a first coordinated AP of one or more coordinated APs. For example, the location capability support information comprises identification information that a second device can use when performing an FTM measurement with the device. The location capability support information can be used by the second device to facilitate a negotiation phase of an enhanced location service negotiation system. The location capability support information can be a modified portion (or an additional portion) of a conventional neighbor report (e.g., the Neighbor Report defined in IEEE 802.11k) that comprises information indicating capabilities of each AP in the one or more coordinated APs. The location support capability support information, as described above, may additionally comprise additional R-AIDs (associated with at least a second coordinated AP of the one or more coordinated APs), a keep-alive timeout associated with the first R-AID, etc.

At block 704, the device may cause to send the neighbor report frame. The device may cause to send the neighbor report frame, e.g., using any of the communication protocols described herein. For example, the device may unicast or broadcast the neighbor report frame to the second device.

At block 706, the device may determine a location measurement of the first coordinated AP of the one or more coordinated APs and a device using the first R-AID. For example, the device can perform a measurement phase with the second device. Particularly, as described above, the device may determine the first location measurement and the second location measurement using a location determination using FTM and/or measurement protocol. Further, the device may, prior to determining the first location measurement, cause to send a TF short feedback to the second device to, e.g., determine scheduling conflicts and positioning requirements of the second device. It is understood that the above descriptions are for purposes of illustration and are not meant to be limiting.

FIG. 8 shows a functional diagram of an exemplary communication station 800 in accordance with some embodiments. In one embodiment, FIG. 8 illustrates a functional block diagram of a communication station that may be suitable for use as an AP 102 (FIG. 1) or a user device 120 (FIG. 1) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer (PHY) communications and/or media access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in FIGS. 1-7.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display.

The machine 900 may additionally include a storage device (i.e., drive unit) 916, a signal generation device 918 (e.g., a speaker), an enhanced location service negotiation device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The enhanced location service negotiation device 919 may carry out or perform any of the operations and processes (e.g., process 600) described and shown above. The enhanced location service negotiation device 919 may define an enhanced FTM protocol for positioning service between a group of coordinated APs and one STA using an extended neighbor report (that comprises at least one R-AID). That STA may be either associated with only one of the APs of the group or an unassociated STA to all.

In another example, the enhanced location service negotiation device 919 may be configured to identify a neighbor report frame received from one or more coordinated access points (APs), wherein the neighbor report frame comprises location capability support information; determine a first ranging associated ID (R-AID) associated with the location capability support information; and determine a first location measurement with a first coordinated AP of the one or more coordinated APs and a second location measurement with a second coordinated AP of the one or more coordinated APs using the first R-AID.

The enhanced location service negotiation device 919 may enhance FTM negotiation to support establishment of an FTM measurement to more than a single AP. Once a single negotiation is established, the STA may then choose one or more possible opportunities, which may meet their positioning requirements and scheduling constraints. If a positioning measurement is not requested by the STA using the R-AID on the FTM Resource Request mechanism (e.g. using the NDP Short Feedback for FTM Range measurement), the context is released and a new FTM negotiation needs to be established.

It is understood that the above are only a subset of what the enhanced location service negotiation device 919 may be configured to perform and that other functions included throughout this disclosure may also be performed by the enhanced location service negotiation device 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may be a device comprising memory and processing circuitry configured to: identify a neighbor report frame received from one or more coordinated access points (APs), wherein the neighbor report frame comprises location capability support information; determine a first ranging associated ID (R-AID) associated with the location capability support information; and determine a first location measurement with a first coordinated AP of the one or more coordinated APs and a second location measurement with a second coordinated AP of the one or more coordinated APs using the first R-AID.

Example 2 may include the device of example 1 and/or some other example herein, wherein the device is unassociated with the one or more coordinated APs.

Example 3 may include the device of example 1 and/or some other example herein, wherein the device is associated with at least one of the one or more coordinated APs.

Example 4 may include the device of example 1 and/or some other example herein, wherein to determine the first location measurement with the one or more coordinated APs using the first R-AID comprises the memory and the processing circuitry being further configured to: identify a trigger frame sent by the first coordinated AP of the one or more coordinated APs, wherein the trigger frame comprises the first R-AID and a first resource unit (RU) of one or more RUs; and cause to send a null data packet (NDP) using the first RU.

Example 5 may include the device of example 1 and/or some other example herein, wherein the memory and the processing circuitry are further configured to determine a second R-AID associated with the location capability support information.

Example 6 may include the device of example 5 and/or some other example herein, wherein to determine the first location measurement with the one or more coordinated APs and the second location measurement with the second coordinated AP of the one or more coordinated APs using the first R-AID comprises the memory and the processing circuitry being further configured to: identify a first trigger frame sent by the first coordinated AP of the one or more coordinated APs, wherein the first trigger frame comprises the first R-AID and a first resource unit (RU) of one or more RUs; cause to send a null data packet (NDP) using the first RU; identify a second trigger frame sent by the second coordinated AP of the one or more coordinated APs, wherein the second trigger frame comprises the second R-AID and a second RU of the one or more RUs; and cause to send a second NDP using the second RU.

Example 7 may include the device of example 5 and/or some other example herein, wherein the first R-AID and the second R-AID are a same value.

Example 8 may include the device of example 5 and/or some other example herein, wherein the first R-AID is a different value than the second R-AID.

Example 9 may include the device of example 1 and/or some other example herein, wherein the location capability support information comprises one or more of a type of location service available at the first coordinated AP of the one or more coordinated APs, a time difference in a traffic filtering service between the first coordinated AP and the second coordinated AP of the one or more coordinated APs, a target beacon transmission time of the first coordinated AP, or a target time of a service period for the location measurement.

Example 10 may include the device of example 1 and/or some other example herein, wherein the memory and the processing circuitry are further configured to determine a keep-alive timeout associated with the first R-AID.

Example 11 may include the device of example 1 and/or some other example herein, further comprising a transceiver configured to transmit and receive wireless signals.

Example 12 may include the device of example 7 and/or some other example herein, further comprising one or more antennas coupled to the transceiver.

Example 13 may include a non-transitory computer-readable medium storing computer-executable instructions which when executed by one or more processors result in performing operations comprising: determining a neighbor report frame, wherein the neighbor report frame comprises location capability support information, wherein the location capability support information comprises a first ranging associated ID (R-AID) associated with a first coordinated AP of one or more coordinated APs; causing to send the neighbor report frame; and determining a location measurement the first coordinated AP of the one or more coordinated APs and a device using the first R-AID.

Example 14 may include the non-transitory computer-readable medium of example 13 and/or some other example herein, wherein the first coordinated AP of the one or more coordinated APs is unassociated with the device.

Example 15 may include the non-transitory computer-readable medium of example 13 and/or some other example herein, wherein the first coordinated AP of the one or more coordinated APs is associated with the device.

Example 16 may include the non-transitory computer-readable medium of example 13 and/or some other example herein, wherein determining the location measurement with the first coordinated AP of the one or more coordinated APs and the device using the first R-AID comprises: determining a trigger frame, wherein the trigger frame comprises a resource unit (RU) of one or more RUs and the first R-AID; causing to send the trigger frame; and identifying a null data packet received from the device using the RU.

Example 17 may include the non-transitory computer-readable medium of example 13 and/or some other example herein, wherein the location capability support information further comprises a second R-AID associated with a second coordinated AP of the one or more coordinated APs.

Example 18 may include the non-transitory computer-readable medium of example 17 and/or some other example herein, wherein the first R-AID and the second R-AID are a same value.

Example 19 may include the non-transitory computer-readable medium of example 17 and/or some other example herein, wherein the first R-AID is a different value than the second R-AID.

Example 20 may include the non-transitory computer-readable medium of example 13 and/or some other example herein, wherein the location capability support information comprises one or more of a type of location service available at the first coordinated AP of the one or more coordinated APs, a time difference in a traffic filtering service between the first coordinated AP and a second coordinated AP of the one or more coordinated APs, a target beacon transmission time of the first coordinated AP, or a target time of a service period for the location measurement.

Example 21 may include a method comprising: identifying, by one or more processors, a neighbor report frame received from one or more coordinated access points (APs), wherein the neighbor report frame comprises location capability support information; determining a first ranging associated ID (R-AID) associated with the location capability support information; and determining a first location measurement with a first coordinated AP of the one or more coordinated APs and a second location measurement with a second coordinated AP of the one or more coordinated APs using the first R-AID.

Example 22 may include the method of example 21 and/or some other example herein, further comprising determining unassociation with the one or more coordinated APs.

Example 23 may include the method of example 21 and/or some other example herein, further comprising determining an association with at least one of the one or more coordinated APs.

Example 24 may include the method of example 21 and/or some other example herein, wherein determining the first location measurement with the one or more coordinated APs using the first R-AID comprises: identifying a trigger frame sent by the first coordinated AP of the one or more coordinated APs, wherein the trigger frame comprises the first R-AID and a first resource unit (RU) of one or more RUs; and causing to send a null data packet (NDP) using the first RU.

Example 25 may include the method of example 21 and/or some other example herein, further comprising determining a second R-AID associated with the location capability support information.

Example 26 may include the method of example 25 and/or some other example herein, wherein to determine the first location measurement with the one or more coordinated APs and the second location measurement with the second coordinated AP of the one or more coordinated APs using the first R-AID comprises: identifying a first trigger frame sent by the first coordinated AP of the one or more coordinated APs, wherein the first trigger frame comprises the first R-AID and a first resource unit (RU) of one or more RUs; causing to send a null data packet (NDP) using the first RU; identifying a second trigger frame sent by the second coordinated AP of the one or more coordinated APs, wherein the second trigger frame comprises the second R-AID and a second RU of the one or more RUs; and causing to send a second NDP using the second RU.

Example 27 may include the method of example 25 and/or some other example herein, wherein the first R-AID and the second R-AID are a same value.

Example 28 may include the method of example 25 and/or some other example herein, wherein the first R-AID is a different value than the second R-AID.

Example 29 may include the method of example 21 and/or some other example herein, wherein the location capability support information comprises one or more of a type of location service available at the first coordinated AP of the one or more coordinated APs, a time difference in a traffic filtering service between the first coordinated AP and the second coordinated AP of the one or more coordinated APs, a target beacon transmission time of the first coordinated AP, or a target time of a service period for the location measurement.

Example 30 may include the method of example 21 and/or some other example herein, further comprising determining a keep-alive timeout associated with the first R-AID.

Example 31 may include an apparatus comprising means for performing a method as claimed in any one of examples 21-30.

Example 32 may include a system, comprising at least one memory device having programmed instruction that, in response to execution cause at least one processor to perform the method of any one of examples 21-30.

Example 33 may include a machine-readable medium including code, when executed, to cause a machine to perform the method of any one of examples 21-30.

Example 34 may include a non-transitory computer-readable medium storing computer-executable instructions which when executed by one or more processors result in performing operations comprising: identifying a neighbor report frame received from one or more coordinated access points (APs), wherein the neighbor report frame comprises location capability support information; determining a first ranging associated ID (R-AID) associated with the location capability support information; and determining a first location measurement with a first coordinated AP of the one or more coordinated APs and a second location measurement with a second coordinated AP of the one or more coordinated APs using the first R-AID.

Example 35 may include the non-transitory computer-readable medium of example 34 and/or some other example herein, wherein the device is unassociated with the one or more coordinated APs.

Example 36 may include the non-transitory computer-readable medium of example 34 and/or some other example herein, wherein the device is associated with at least one of the one or more coordinated APs.

Example 37 may include the non-transitory computer-readable medium of example 34 and/or some other example herein, wherein to determine the first location measurement with the one or more coordinated APs using the first R-AID comprises the operations further comprising: identifying a trigger frame sent by the first coordinated AP of the one or more coordinated APs, wherein the trigger frame comprises the first R-AID and a first resource unit (RU) of one or more RUs; and causing to send a null data packet (NDP) using the first RU.

Example 38 may include the non-transitory computer-readable medium of example 34 and/or some other example herein, wherein the operations further comprise determining a second R-AID associated with the location capability support information.

Example 39 may include the non-transitory computer-readable medium of example 38 and/or some other example herein, wherein to determine the first location measurement with the one or more coordinated APs and the second location measurement with the second coordinated AP of the one or more coordinated APs using the first R-AID comprises the operations further comprising: identifying a first trigger frame sent by the first coordinated AP of the one or more coordinated APs, wherein the first trigger frame comprises the first R-AID and a first resource unit (RU) of one or more RUs; causing to send a null data packet (NDP) using the first RU; identifying a second trigger frame sent by the second coordinated AP of the one or more coordinated APs, wherein the second trigger frame comprises the second R-AID and a second RU of the one or more RUs; and causing to send a second NDP using the second RU.

Example 40 may include the non-transitory computer-readable medium of example 38 and/or some other example herein, wherein the first R-AID and the second R-AID are a same value.

Example 41 may include the non-transitory computer-readable medium of example 38 and/or some other example herein, wherein the first R-AID is a different value than the second R-AID.

Example 42 may include the non-transitory computer-readable medium of example 34 and/or some other example herein, wherein the location capability support information comprises one or more of a type of location service available at the first coordinated AP of the one or more coordinated APs, a time difference in a traffic filtering service between the first coordinated AP and the second coordinated AP of the one or more coordinated APs, a target beacon transmission time of the first coordinated AP, or a target time of a service period for the location measurement.

Example 43 may include the non-transitory computer-readable medium of example 34 and/or some other example herein, wherein the operations further comprise determining a keep-alive timeout associated with the first R-AID.

Example 44 may include an apparatus comprising: means for identifying a neighbor report frame received from one or more coordinated access points (APs), wherein the neighbor report frame comprises location capability support information; means for determining a first ranging associated ID (R-AID) associated with the location capability support information; and means for determining a first location measurement with a first coordinated AP of the one or more coordinated APs and a second location measurement with a second coordinated AP of the one or more coordinated APs using the first R-AID.

Example 45 may include the apparatus of example 44 and/or some other example herein, wherein the device is unassociated with the one or more coordinated APs.

Example 46 may include the apparatus of example 44 and/or some other example herein, wherein the device is associated with at least one of the one or more coordinated APs.

Example 47 may include the apparatus of example 44 and/or some other example herein, wherein to determine the first location measurement with the one or more coordinated APs using the first R-AID comprises: means for identifying a trigger frame sent by the first coordinated AP of the one or more coordinated APs, wherein the trigger frame comprises the first R-AID and a first resource unit (RU) of one or more RUs; and means for causing to send a null data packet (NDP) using the first RU.

Example 48 may include the apparatus of example 44 and/or some other example herein, further comprising means for determining a second R-AID associated with the location capability support information.

Example 49 may include the apparatus of example 48 and/or some other example herein, wherein to determine the first location measurement with the one or more coordinated APs and the second location measurement with the second coordinated AP of the one or more coordinated APs using the first R-AID comprises: means for identifying a first trigger frame sent by the first coordinated AP of the one or more coordinated APs, wherein the first trigger frame comprises the first R-AID and a first resource unit (RU) of one or more RUs; means for causing to send a null data packet (NDP) using the first RU; means for identifying a second trigger frame sent by the second coordinated AP of the one or more coordinated APs, wherein the second trigger frame comprises the second R-AID and a second RU of the one or more RUs; and means for causing to send a second NDP using the second RU.

Example 50 may include the apparatus of example 48 and/or some other example herein, wherein the first R-AID and the second R-AID are a same value.

Example 51 may include the apparatus of example 48 and/or some other example herein, wherein the first R-AID is a different value than the second R-AID.

Example 52 may include the apparatus of example 44 and/or some other example herein, wherein the location capability support information comprises one or more of a type of location service available at the first coordinated AP of the one or more coordinated APs, a time difference in a traffic filtering service between the first coordinated AP and the second coordinated AP of the one or more coordinated APs, a target beacon transmission time of the first coordinated AP, or a target time of a service period for the location measurement.

Example 53 may include the apparatus of example 44 and/or some other example herein, further comprising means for determining a keep-alive timeout associated with the first R-AID.

Example 54, the device comprising memory and processing circuitry configured to: determine a neighbor report frame, wherein the neighbor report frame comprises location capability support information, wherein the location capability support information comprises a first ranging associated ID (R-AID) associated with a first coordinated AP of one or more coordinated APs; cause to send the neighbor report frame; and determine a location measurement the first coordinated AP of the one or more coordinated APs and a device using the first R-AID.

Example 55 may include the device of example 54 and/or some other example herein, wherein the first coordinated AP of the one or more coordinated APs is unassociated with the device.

Example 56 may include the device of example 54 and/or some other example herein, wherein the first coordinated AP of the one or more coordinated APs is associated with the device.

Example 57 may include the device of example 54 and/or some other example herein, wherein determining the location measurement with the first coordinated AP of the one or more coordinated APs and the device using the first R-AID comprises the memory and the processing circuitry being further configured to: determine a trigger frame, wherein the trigger frame comprises a resource unit (RU) of one or more RUs and the first R-AID; cause to send the trigger frame; and identify a null data packet received from the device using the RU.

Example 58 may include the device of example 54 and/or some other example herein, wherein the location capability support information further comprises a second R-AID associated with a second coordinated AP of the one or more coordinated APs.

Example 59 may include the device of example 58 and/or some other example herein, wherein the first R-AID and the second R-AID are a same value.

Example 60 may include the device of example 58 and/or some other example herein, wherein the first R-AID is a different value than the second R-AID.

Example 61 may include the device of example 54 and/or some other example herein, wherein the location capability support information comprises one or more of a type of location service available at the first coordinated AP of the one or more coordinated APs, a time difference in a traffic filtering service between the first coordinated AP and a second coordinated AP of the one or more coordinated APs, a target beacon transmission time of the first coordinated AP, or a target time of a service period for the location measurement.

Example 62 may include the device of example 54 and/or some other example herein, further comprising a transceiver configured to transmit and receive wireless signals.

Example 63 may include the device of example 62 and/or some other example herein, further comprising one or more antennas coupled to the transceiver.

Example 64 may include a method comprising: determining a neighbor report frame, wherein the neighbor report frame comprises location capability support information, wherein the location capability support information comprises a first ranging associated ID (R-AID) associated with a first coordinated AP of one or more coordinated APs; causing to send the neighbor report frame; and determining a location measurement the first coordinated AP of the one or more coordinated APs and a device using the first R-AID.

Example 65 may include the method of example 64 and/or some other example herein, wherein the first coordinated AP of the one or more coordinated APs is unassociated with the device.

Example 66 may include the method of example 64 and/or some other example herein, wherein the first coordinated AP of the one or more coordinated APs is associated with the device.

Example 67 may include the method of example 64 and/or some other example herein, wherein determining the location measurement with the first coordinated AP of the one or more coordinated APs and the device using the first R-AID comprises: determining a trigger frame, wherein the trigger frame comprises a resource unit (RU) of one or more RUs and the first R-AID; causing to send the trigger frame; and identifying a null data packet received from the device using the RU.

Example 68 may include the method of example 64 and/or some other example herein, wherein the location capability support information further comprises a second R-AID associated with a second coordinated AP of the one or more coordinated APs.

Example 69 may include the method of example 68 and/or some other example herein, wherein the first R-AID and the second R-AID are a same value.

Example 70 may include the method of example 68 and/or some other example herein, wherein the first R-AID is a different value than the second R-AID.

Example 71 may include the method of example 64 and/or some other example herein, wherein the location capability support information comprises one or more of a type of location service available at the first coordinated AP of the one or more coordinated APs, a time difference in a traffic filtering service between the first coordinated AP and a second coordinated AP of the one or more coordinated APs, a target beacon transmission time of the first coordinated AP, or a target time of a service period for the location measurement.

Example 72 may include an apparatus comprising means for performing a method as claimed in any one of examples 64-71.

Example 73 may include a system, comprising at least one memory device having programmed instruction that, in response to execution cause at least one processor to perform the method of any one of examples 64-71.

Example 74 may include a machine-readable medium including code, when executed, to cause a machine to perform the method of any one of examples 64-71.

Example 75 may include an apparatus comprising: means for determining a neighbor report frame, wherein the neighbor report frame comprises location capability support information, wherein the location capability support information comprises a first ranging associated ID (R-AID) associated with a first coordinated AP of one or more coordinated APs; means for causing to send the neighbor report frame; and means for determining a location measurement the first coordinated AP of the one or more coordinated APs and a device using the first R-AID.

Example 76 may include the apparatus of example 75 and/or some other example herein, wherein the first coordinated AP of the one or more coordinated APs is unassociated with the device.

Example 77 may include the apparatus of example 75 and/or some other example herein, wherein the first coordinated AP of the one or more coordinated APs is associated with the device.

Example 78 may include the apparatus of example 75 and/or some other example herein, wherein determining the location measurement with the first coordinated AP of the one or more coordinated APs and the device using the first R-AID comprises: means for determining a trigger frame, wherein the trigger frame comprises a resource unit (RU) of one or more RUs and the first R-AID; means for causing to send the trigger frame; and means for identifying a null data packet received from the device using the RU.

Example 79 may include the apparatus of example 75 and/or some other example herein, wherein the location capability support information further comprises a second R-AID associated with a second coordinated AP of the one or more coordinated APs.

Example 80 may include the apparatus of example 79 and/or some other example herein, wherein the first R-AID and the second R-AID are a same value.

Example 81 may include the apparatus of example 79 and/or some other example herein, wherein the first R-AID is a different value than the second R-AID.

Example 82 may include the apparatus of example 79 and/or some other example herein, wherein the location capability support information comprises one or more of a type of location service available at the first coordinated AP of the one or more coordinated APs, a time difference in a traffic filtering service between the first coordinated AP and a second coordinated AP of the one or more coordinated APs, a target beacon transmission time of the first coordinated AP, or a target time of a service period for the location measurement.

Example 83 may include an apparatus comprising means for performing a method as claimed in any of the preceding examples.

Example 84 may include machine-readable storage including machine-readable instructions, when executed, to implement a method as claimed in any preceding example.

Example 85 may include machine-readable storage including machine-readable instructions, when executed, to implement a method or realize an apparatus as claimed in any preceding example.

Example 86 may include one or more non-transitory computer-readable media comprising instructions to cause an electronic device, upon execution of the instructions by one or more processors of the electronic device, to perform one or more elements of a method described in or related to any of examples 1-82, or any other method or process described herein.

Example 87 may include an apparatus comprising logic, modules, and/or circuitry to perform one or more elements of a method described in or related to any of examples 1-82 or any other method or process described herein.

Example 88 may include a method, technique, or process as described in or related to any of examples 1-82, or portions or parts thereof.

Example 89 may include an apparatus comprising: one or more processors and one or more computer readable media comprising instructions that, when executed by the one or more processors, cause the one or more processors to perform the method, techniques, or process as described in or related to any of examples 1-82, or portions thereof.

Example 90 may include a method of communicating in a wireless network as shown and described herein.

Example 91 may include a system for providing wireless communication as shown and described herein.

Example 92 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising memory and processing circuitry configured to:
    identify a neighbor report frame received from one or more coordinated access points (APs), wherein the neighbor report frame comprises location capability support information;
    determine a first ranging associated ID (R-AID) associated with the location capability support information;
    determine a second R-AID associated with the location capability support information; and
    determine a first location measurement with a first coordinated AP of the one or more coordinated APs and a second location measurement with a second coordinated AP of the one or more coordinated APs using the first R-AID.

2. The device of claim 1, wherein the device is unassociated with the one or more coordinated APs.

3. The device of claim 1, wherein the device is associated with at least one of the one or more coordinated APs.

4. The device of claim 1, wherein to determine the first location measurement with the one or more coordinated APs using the first R-AID comprises the memory and the processing circuitry being further configured to:
    identify a trigger frame sent by the first coordinated AP of the one or more coordinated APs, wherein the trigger frame comprises the first R-AID and a first resource unit (RU) of one or more RUs; and
    cause to send a null data packet (NDP) using the first RU.

5. The device of claim 1, wherein to determine the first location measurement with the one or more coordinated APs and the second location measurement with the second coordinated AP of the one or more coordinated APs using the first R-AID comprises the memory and the processing circuitry being further configured to:
    identify a first trigger frame sent by the first coordinated AP of the one or more coordinated APs, wherein the first trigger frame comprises the first R-AID and a first resource unit (RU) of one or more RUs;
    cause to send a null data packet (NDP) using the first RU;
    identify a second trigger frame sent by the second coordinated AP of the one or more coordinated APs, wherein the second trigger frame comprises the second R-AID and a second RU of the one or more RUs; and
    cause to send a second NDP using the second RU.

6. The device of claim 1, wherein the first R-AID and the second R-AID are a same value.

7. The device of claim 1, wherein the first R-AID is a different value than the second R-AID.

8. The device of claim 1, wherein the location capability support information comprises one or more of a type of location service available at the first coordinated AP of the one or more coordinated APs, a time difference in a traffic filtering service between the first coordinated AP and the second coordinated AP of the one or more coordinated APs, a target beacon transmission time of the first coordinated AP, or a target time of a service period for the location measurement.

9. The device of claim 1, wherein the memory and the processing circuitry are further configured to determine a keep-alive timeout associated with the first R-AID.

10. The device of claim 1, further comprising a transceiver configured to transmit and receive wireless signals.

11. The device of claim 10, further comprising one or more antennas coupled to the transceiver.

12. A non-transitory computer-readable medium storing computer-executable instructions that, when executed by one or more processors, result in performing operations comprising:
 determining a neighbor report frame, wherein the neighbor report frame comprises location capability support information, wherein the location capability support information comprises a first ranging associated ID (R-AID) associated with a first coordinated AP of one or more coordinated APs;
 causing to send the neighbor report frame; and
 determining a location measurement with the first coordinated AP of the one or more coordinated APs and a device using the first R-AID, wherein determining the location measurement with the first coordinated AP of the one or more coordinated APs and the device using the first R-AID comprises:
  determining a trigger frame, wherein the trigger frame comprises a resource unit (RU) of one or more RUs and the first R-AID;
  causing to send the trigger frame; and
  identifying a null data packet received from the device using the RU.

13. The non-transitory computer-readable medium of claim 12, wherein the first coordinated AP of the one or more coordinated APs is unassociated with the device.

14. The non-transitory computer-readable medium of claim 12, wherein the first coordinated AP of the one or more coordinated APs is associated with the device.

15. The non-transitory computer-readable medium of claim 12, wherein the location capability support information further comprises a second R-AID associated with a second coordinated AP of the one or more coordinated APs.

16. The non-transitory computer-readable medium of claim 15, wherein the first R-AID and the second R-AID are a same value.

17. The non-transitory computer-readable medium of claim 15, wherein the first R-AID is a different value than the second R-AID.

18. A method comprising:
 identifying, by one or more processors, a neighbor report frame received from one or more coordinated access points (APs), wherein the neighbor report frame comprises location capability support information;
 determining a first ranging associated ID (R-AID) associated with the location capability support information; and
 determining a second R-AID associated with the location capability support information; and
 determining a first location measurement with a first coordinated AP of the one or more coordinated APs and a second location measurement with a second coordinated AP of the one or more coordinated APs using the first R-AID.

* * * * *